(12) United States Patent
Kerr

(10) Patent No.: US 10,386,003 B2
(45) Date of Patent: Aug. 20, 2019

(54) CHOKE FOR A FLOW LINE

(71) Applicant: Northern Blizzard Resources Inc., Edmonton (CA)

(72) Inventor: Derek J Kerr, Luseland (CA)

(73) Assignee: Derek J. Kerr, Luseland, Saskatchewa (CA)

( * ) Notice: Subject to any disclaimer, the term of this patent is extended or adjusted under 35 U.S.C. 154(b) by 29 days.

(21) Appl. No.: 14/868,476

(22) Filed: Sep. 29, 2015

(65) Prior Publication Data

US 2017/0023034 A1  Jan. 26, 2017

(30) Foreign Application Priority Data

Jul. 22, 2015 (CA) .................................... 2897994

(51) Int. Cl.
*F16L 55/027* (2006.01)
*F16L 57/06* (2006.01)

(52) U.S. Cl.
CPC ....... *F16L 55/027* (2013.01); *F16L 55/02781* (2013.01); *F16L 57/06* (2013.01)

(58) Field of Classification Search
CPC ............................ F16L 55/027; F16L 55/02781
USPC ..................................................... 138/42, 40
See application file for complete search history.

(56) References Cited

U.S. PATENT DOCUMENTS

| | | | |
|---|---|---|---|
| 2,271,982 A * | 2/1942 | Van Kreveld | A01J 11/16 138/44 |
| 2,501,593 A | 3/1950 | Becker | |
| 3,072,261 A | 1/1963 | Smith | |
| 3,722,854 A * | 3/1973 | Parola | F16K 47/08 137/625.28 |
| 3,724,494 A * | 4/1973 | Alber | G05D 7/0133 137/501 |
| 3,921,672 A | 11/1975 | Arnold | |
| 4,124,309 A * | 11/1978 | Yao | B01F 5/0644 366/340 |
| 4,234,008 A | 11/1980 | Cronfel | |
| 4,527,595 A * | 7/1985 | Jorgensen | G05D 7/0113 138/43 |
| 4,644,974 A * | 2/1987 | Zingg | B05B 1/00 138/40 |
| 5,315,859 A * | 5/1994 | Schommer | E03C 1/08 73/1.25 |
| 5,417,481 A * | 5/1995 | Megerle | B60T 8/42 138/42 |
| 5,771,922 A | 6/1998 | Fisher | |

(Continued)

FOREIGN PATENT DOCUMENTS

EP   1503132 A1 *  2/2005  ............ F16L 55/027

*Primary Examiner* — Craig M Schneider
*Assistant Examiner* — David R Deal
(74) *Attorney, Agent, or Firm* — David & Bujold PLLC; Michael J. Bujold

(57) ABSTRACT

A choke for a flow line having an inner diameter has a body with an upstream end, a downstream end, and a sidewall that extends between the upstream end and the downstream end. The sidewall has a diameter that is sized to fit within the inner diameter of the flow line. A fluid impact face is provided at the upstream end of the body. The fluid impact face has a recessed central portion. One or more passages provide fluid communication between the downstream end and the sidewall of the body.

14 Claims, 3 Drawing Sheets

(56) References Cited

U.S. PATENT DOCUMENTS

| | | | | |
|---|---|---|---|---|
| 5,779,361 | A * | 7/1998 | Sugiura | B01F 5/0268 138/42 |
| 5,937,909 | A * | 8/1999 | Clauss | F02M 59/466 138/43 |
| 6,715,505 | B2 * | 4/2004 | Higuchi | F16K 47/04 137/605 |
| 7,735,550 | B2 * | 6/2010 | Sun | E21B 27/02 138/43 |
| 7,878,705 | B2 * | 2/2011 | Schauerte | B01F 5/0646 366/337 |
| 7,942,166 | B1 * | 5/2011 | Lu | B23B 45/04 137/891 |
| 8,272,403 | B2 * | 9/2012 | Stallmann | F01L 1/34 137/625.69 |
| 8,480,133 | B2 * | 7/2013 | Zhang | B64D 37/14 285/128.1 |
| 8,820,414 | B2 | 9/2014 | Mathiesen et al. | |
| 2003/0178077 | A1 * | 9/2003 | Ramirez-Rivera | G01F 15/00 138/44 |

* cited by examiner

VIEW A

ISOMETRIC VIEW

CHOKE FOR A FLOW LINE

TECHNICAL FIELD

This relates to a choke element for reducing the velocity and pressure of a fluid flow in a flow line. The choke element may be used to protect upstream or downstream flow restricting devices.

BACKGROUND

Erosional wear on piping located downstream of flow restricting devices is commonly caused by high velocity fluids jetting the inside surfaces of piping due to the high differential pressures across a flow restricting device. The fluids that are jetting the internal surfaces may contain impurities such as solids, which can erode the piping and reduce the effective life of the piping. The erosion in the internals of injection wellhead piping is caused by high pressure water jet streams that result from high differential pressure across chokes with the most significant damage found in piping of injection wells that have very low injection wellhead pressures. Traditional methods of installing blast tees or soft elbows to reduce erosional effects are used extensively in industry.

There have been a wide variety of devices used to restrict the flow of fluids by providing a fixed or automatically controlled restriction in a flow channels, conduits or tubulars. There are also a variety of devices used to address erosional issues that are associated with high velocity fluids in flow channels, conduits or tubulars.

If fluid flow velocity is decreased and the flow is dispersed, there will be a number of beneficial results. A number of attempts at holding back pressure and reducing fluid velocity have been made. In certain devices, a conventional choke design has been used and modified to try to accomplish a decrease in pressure and velocity. Examples of devices that have attempted to accomplish this include U.S. Pat. No. 5,771,922 (Fisher) entitled "For restricting fluid flow through a flow channel"; U.S. Pat. No. 4,234,008 (Cronfel) entitled "Fluid choke"; U.S. Pat. No. 3,921,672 (Arnold) entitled "Choke for controlling flow of pressurized fluid", U.S. Pat. No. 3,072,261 (Smith) entitled "Sediment trapping hydraulic restriction"; and U.S. Pat. No. 2,501,593 (Becker) entitled "Flow bean". Each of these devices have addressed pressure drop, reduced fluid velocity and recognized that there may be some solids in the flow.

SUMMARY

There is provided a choke element for a flow line having an inner diameter. The choke element comprises a body having an upstream end, a downstream end, and a sidewall that extends between the upstream end and the downstream end. The sidewall has an outer diameter that is sized to fit within the inner diameter of the flow line. The choke has a fluid impact face at the upstream end of the body, the fluid impact face having a recessed central portion. There are one or more passages in fluid communication between the downstream end and the upstream end of the body.

According to an aspect, the recessed central portion may be a concave surface, and the concave surface may be conical.

According to an aspect, the sidewall may be sized to create a flow restriction between the outer sidewall and the inner surface of the flow line.

According to further aspects, the one or more passages may comprise one or more inlets formed in the sidewall of the body at a point downstream of the flow restriction between the outer sidewall and the inner surface of the flow line, and the one or more inlets may comprise one or more radial passages that extend inward from the sidewall and an axial passage that intersects the one or more radial passages and is in fluid communication with the downstream end of the body. The radial passages may have a common point of intersection within the body. The flow area of the axial passage at the downstream end of the body may be greater than the flow area of the axial passage at the radial passages.

According to an aspect, the body may comprise a threaded surface toward the downstream end that is sized to engage an inner threaded surface of the flow line.

According to another aspect, there is provided, in combination, a flow line having a sidewall having inner diameter and the choke as described above.

In one example, there is provided a choke, or velocity impact flow disperser assembly, for reducing velocity and pressure, minimizing erosional impact and dispersing a fluid flow in a piping system wherein there is a high upstream pressure and a desired lower downstream pressure. The velocity impact flow disperser system may comprise a velocity impact flow disperser body having an inlet for receiving pressurized fluids at erosional velocities, and is designed to reduce fluid pressures and fluid velocities at the outlet relative to the inlet. The inlet of the velocity impact flow disperser assembly may include a fluid impact face that initially contacts the fluid flow to be restricted, where the fluid impact face has a recessed central portion, such as a concave conical face on the velocity impact flow disperser body that accepts high pressure and erosional velocity fluids to impact upon it, disperses the erosional fluid flow, creates turbulent flow on the concave conical face, and thereby minimizes erosion on the inlet portion of the velocity impact flow disperser body. The internal section of the velocity impact flow disperser assembly may have primary and secondary annular flow areas that accept flow from inlet fluids. This flow is distributed evenly throughout the annular areas. The internal section of velocity impact flow disperser body may have plural holes in the secondary annular flow area, where the plural holes each allow a proportion of the fluid flow to an internal zone within the velocity impact flow disperser body. The plural holes may be angularly aligned relative to each other to thereby cause the fluids to collide in the internal zone proximate the point of discharge of the plural holes. The outlet of the velocity impact flow disperser body may originate at an internal point where fluid streams from the plural holes meet in a fluid collision area, and the outlet increases in size from the fluid collision area as it leaves the most downstream edge of the velocity impact flow disperser. The external threads on the outside surface of the velocity impact flow disperser body may allow the device to be threaded into or out of matching tubular element. A wrench profile may be provided on downstream end of the velocity impact flow disperser body to allow the velocity impact flow disperser body to be threaded into or out of the tubular element. A tubular element may be provided that securely holds the velocity impact flow disperser body in a piping system and that has an internal thread that matches with the external thread of the velocity impact flow disperser body. The relative flow area sizes of the various zones and flow passages may be selected to achieve a preferred flow profile through the choke. For example, each zone or flow area may get progressively larger as the flow progresses through the choke, or the flow areas may vary from one point to the next. While it is generally preferable to have the flow area of the outlet greater than the flow area of the inlet, it will be understood that the design may vary.

According to an aspect, the recessed central portion of the impact face, or concave conical face on the upstream end of the velocity impact flow disperser body may have sufficient outside diameter and overall depth of concave cone to cause appropriate turbulence to reduce erosional effects of high pressure and high velocity fluids on the inlet end of the velocity impact flow disperser system. The dimensions of the concave conical face may be sized to meet the specific fluid properties of chemical makeup, pressure, temperature and flow rate conditions.

According to an aspect, the primary annular flow area of the choke body may be completely concentric in the tubular element in which it is fastened into. The primary annular flow area may allow uniform fluid flow to the secondary annular flow area.

According to an aspect, the secondary annular flow area may contain the entrance of plural holes drilled into the choke body to intersect angularly to a lower pressure area within the middle central region.

According to an aspect, there may be two or more holes that originate from the secondary annular flow area on the choke body. The plural holes may have discharge ends that are aligned in mutually opposed relationship.

According to an aspect, the collision zone for the holes meeting at a central cross sectional area of choke body may have a flow area greater than or equal to the total cross sectional flow area of the plural holes. The collision zone may allow fluids to flow to the outlet of the choke body.

According to an aspect, the outlet of the choke body may originate in a central area. The fluid outlet of the choke body may telescope or gradually increase concentrically in flow surface area from the central fluid collision area until it exits on the downstream end of the choke. The central axes of the bores of the plural holes may be generally transverse to the central axis of the outlet.

According to an aspect, the external threads of the velocity impact flow disperser body may be near the outlet of the choke body.

According to an aspect, the wrench profile on the outlet end of the choke body may be of common industry design so as to allow anyone skilled in the art to be able to install or remove it, and allow the choke body to be threaded into or out of the tubular element.

According to an aspect, the internal threads of the tubular element may match in type and profile the external threads on the choke body.

In another example, a choke, or velocity impact flow disperser assembly, may be used to control the flow of pressurized fluids in a conduit from a high upstream pressure to a lower downstream pressure and wherein high velocity fluids damage the internal surfaces of the piping by erosion in both upstream and downstream vicinities of the velocity impact flow disperser. The velocity impact flow disperser assembly may have a body that has an inlet and outlet respectively disposed in the upstream and downstream flow of pressurized fluids through the piping with external and internal passageways of the body of the velocity impact flow disperser assembly connecting the inlet and outlet in flow through relationship. The inlet of velocity impact flow disperser assembly may comprise a concave cone on an upstream face of the velocity impact flow disperser body where high pressure and high velocity fluid impacts the concave cone on the upstream face of the velocity impact flow disperser causing fluid to collide with the cone and then forcefully flow back against the main fluid flow to impinge upon the concave cone and leading edge of the velocity impact flow disperser, resulting in fluid flow around the leading edge of the front face of the device in a primary annular passageway, or flow restriction, between the outside diameter of the velocity impact flow disperser body and the inside diameter of the tubular element. The turbulent fluid flow due to the impact with the concave cone reduces erosion on the leading edge of the velocity impact flow disperser body and on the surrounding tubular element. The primary annular cross sectional flow area is preferably smaller than inlet tubular cross sectional area to decrease fluid flowing pressure to a desired operating condition and reduce erosion downstream of the velocity impact flow disperser. The primary annular cross sectional flow area is preferably at least as large as the largest possible upstream or downstream choke cross sectional area being used in the piping. The secondary annular cross sectional flow area may be the same as or larger than the primary cross sectional flow area and fluid flow velocities will be either the same or less than primary annular cross sectional flow area velocities. The secondary annular cross sectional flow area may contain the origin of multiple holes that define passageways that extend into the central interior region of the velocity impact flow disperser body. The total cross-sectional flow area of the holes may be greater than the cross sectional flow area of the secondary annular flow area, resulting in a decrease in fluid velocity and flowing pressures as compared to the velocity and pressures in the secondary annular cross sectional flow area, or may be less than the cross sectional flow area of the secondary annular flow area to help control the flow. The holes may be positioned such that they intersect angularly in the central interior area of the velocity impact flow disperser body and the outlet ends of the holes may be aligned in a mutually opposed relationship to cause a collision of the fluid flows. The collision area of the holes in the central interior area of the velocity impact flow disperser body may have a cross sectional area that is equal to or greater than the total cross sectional area of the plural holes. The collision area in the central interior area of the velocity impact flow disperser body may allow fluids to flow through a progressively larger outlet hole of the velocity impact flow disperser body. The outlet of the velocity impact flow disperser body may have a lower fluid velocity and lower flowing pressure than exhibited at the collision area within the body of the velocity impact flow disperser. The external threads of the velocity impact flow disperser body may engage with matching internal threads in the tubular element such that all fluids must pass through the velocity impact flow disperser body.

In other aspects, the features described above may be combined together in any reasonable combination and unless the features are mutually exclusive as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
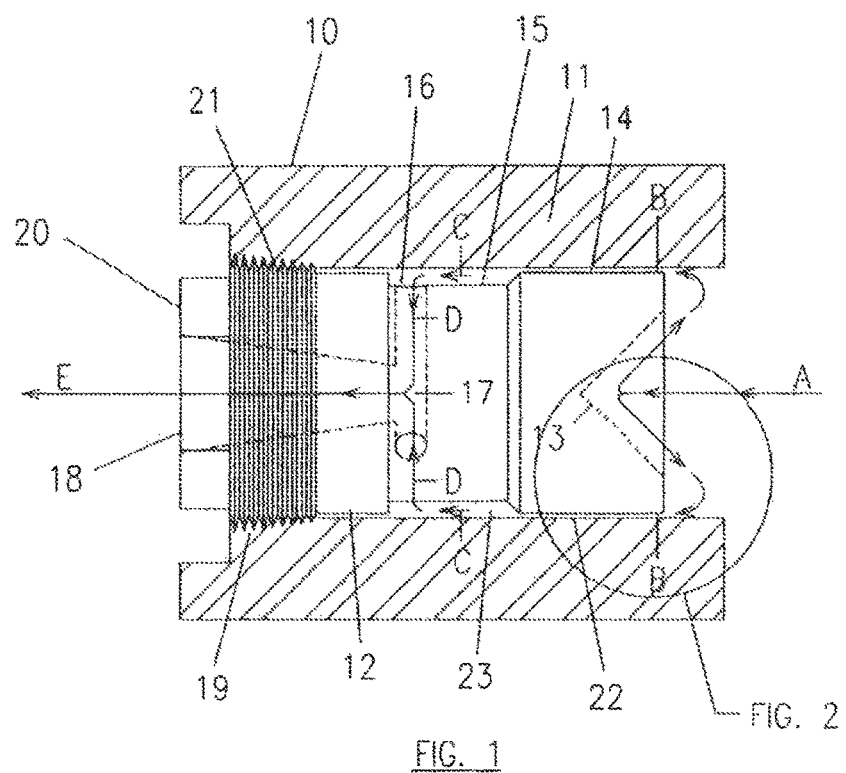
FIG. 1 is a side cross-sectional view of a choke for a flow line.

A choke for a flow line generally identified by reference numeral 10, will now be described with reference to FIG. 1 through 6. Choke 10 as depicted is designed to be used to disperse fluid flow in a flow line that impacts the choke, and to reduce the pressure of the fluid flow to a desired level or by a desired amount. Choke 10 is also designed to reduce the amount of erosion caused by the fluid flow.

Referring to FIG. 1, choke 10 has a main body 12 sized to fit within a tubular element 11. Body 12 and tubular element 11 may made from any suitable material or combination of materials, such as plastic, PTFE, metal, fiberglass, composite or any suitable material or combination thereof). Tubular element 11 is a length of tubing that is installed as part of a flow line through which fluid flows. As shown, tubular element 11 is a short piece of tubing, but may be any desired length, and may be modified depending on the manner in which body 12 is installed.

Main body 12 defines a flow path through tubular element 11 that causes a reduction in the fluid velocity and pressure. In the depicted example, the flow path follows the flow path indicated by: path A where the flow is diverted by a concave surface 13 that acts as an impact area; path B where the flow travels along the annular area 22 that acts as a flow restriction and is defined by the outer diameter 14 of the sidewall of the body; path C where the body defines a larger annular area 23 along which fluid flows; path D where the flow passes through holes 16, or radial passages, into the interior of body 12 and into a fluid collision area 17; and exiting along path E, defined by an axial passage 18 acting as a fluid flow outlet.

Figure 5:
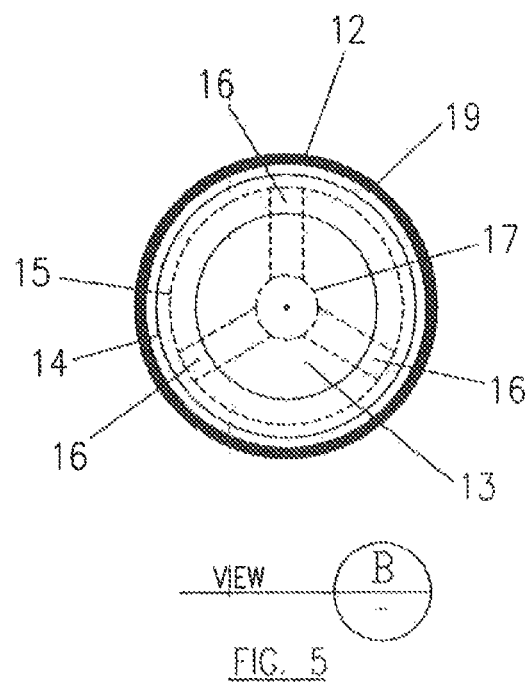
FIG. 5 is an end elevation view of a choke for a flow line.

In the depicted embodiment, when fluid enters the choke 10 it travels in path A, it impacts the end of the choke body 12 at impact face 13. Impact face 13 is a concave surface, such as a concave cone as shown. It will be understood that, while a concave cone is a preferable shape, other shapes for concave surface 13 may also be used, such as a curved surface or a partial cone (e.g. a cone with a flat top, rather than pointed top). After fluids have impacted on cone 13, the fluids will swirl in a turbulent motion and follow path B around the outside upstream diameter 14 of choke body 12. Fluids in flow path B will flow through the annular area 22 where the outside diameter 14 of the main body 12 will be in close tolerance with the inside diameter of the tubular element 11, acting as a flow restriction. It is preferable to have this annular area larger than the largest opening in the restrictive choke or controlling device, which will be either upstream or downstream of the choke 10. As fluid flows through the body 12, variations in the relative flow areas will change whether the fluid velocity and pressure increases or decreases from one path to the next. In one example, fluids may increase in velocity from path A to path B by flowing through the annular area 22 and then decreased in velocity in path C as fluids enter the annular area 23, which may have a larger flow area than annular area 22. Fluids may further decrease in velocity as they flow through to path D in the plural holes 16, which have a combined flow area that is greater than the flow area of annular area 23. Alternatively, path D may have a reduced flow area, such that it acts as a flow restriction, rather than acting to reduce velocity. Preferably, holes 16 are radial passages that are perpendicular to the axis of body 12, such that they collide in the interior 17 of body 12 and thereby reduce the effects of erosion on the inside of choke body 12. Holes 16 may also be at angles other than perpendicular and still collide to reduce erosion. The fluids may be further reduced in velocity as they exit the choke body 12 through outlet 18 along flow path E. Outlet 18 is preferably an axial passage that extends out the back of body 12. Area 23, located between the exterior of choke body 12 and the interior surface of tubular element 11, is preferably calculated so as not to restrict full flow capacity rating of any upstream or downstream choke or flow restricting device. It will be understood that the relative fluid velocity and pressure may be controlled by varying the flow area of each section of body 12, and thus control to a certain degree the effect of erosion on or adjacent to body 12. For example, the flow area of holes 16 may be less than the flow area of annular area 23 or even annular area 22. However it is preferred that, ultimately, the flow area of outlet 18 be greater than annular area 22, and if used to protect another flow control device, the restriction applied by choke body 12 will be less than the restriction applied by the other flow control device, such that choke body 12 acts to reduce the impact of erosive flow, but still allows the flow control device to ultimately control the fluid velocity and pressure in the flow line. The size and number of holes 16 will be determined by the desired flow area. The embodiment shown in FIG. 5 shows three holes 16 in choke body 12, but the number of holes may be more or less than this depending on the preferences of the user and the required flow area. The diameter of outlet hole 18 will be selected to achieve a desired cross sectional area of the plural holes 16 of choke body 12.

Figure 3:
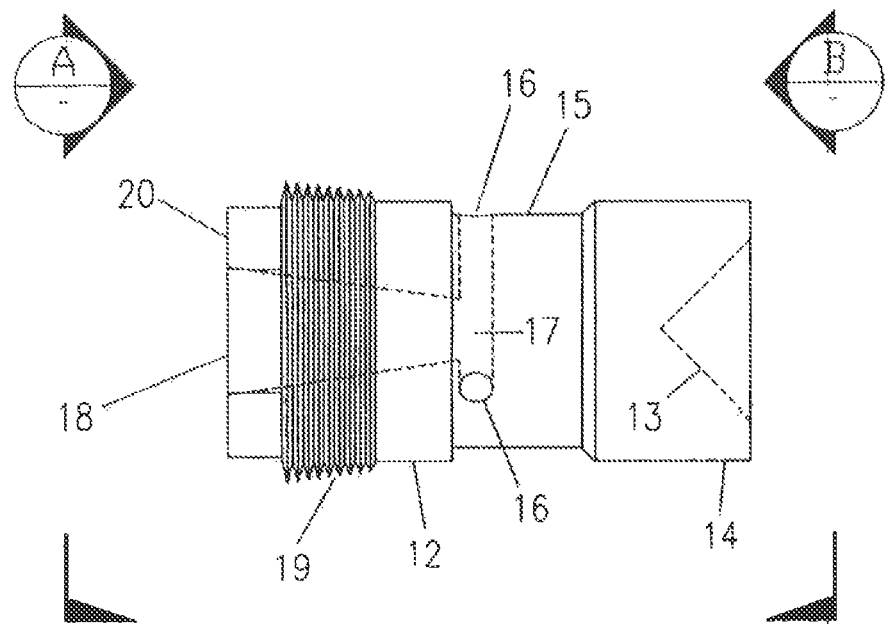
FIG. 3 is a side cross-sectional view of a choke for a flow line.

Referring to FIG. 3, body 12 is shown as having an exterior thread 19 and a wrench connection 20 that allows body 12 to be rotated in order to cause exterior thread 19 to engage an interior thread 21 of tubular element 11. Exterior thread 19 of choke body 12 is designed to match the type and size of interior thread 21 of tubular element 11. The choke body 12 will be held securely when it is sufficiently threaded into tubular element 11. The embodiment shown in FIG. 1 shows a hexagonal head at the exit end of choke body 12, but the mechanism and profile that allows the choke 10 to be threaded into or out of tubular element 11 can be any shape or design to allow a suitable wrench to securely rotate the choke body 12 as appropriate. In addition, while a threaded connection is shown, it will be understood that other types of connections may also be used as are known in the art.

The flow patterns and flow pattern changes in the depicted example are indicated by paths A, B, C, D and E in FIG. 1. It will be understood that, while the drawings depict an example from which beneficial results may be achieved, modifications may be made to these flow paths that may either depart from the ideal, or to account for different circumstances.

Fluid path A illustrates how fluid flow impinges on the concave cone at the upstream end of the choke body 12. Fluid in path A is forced back on its self and the fluid becomes turbulent in front of the choke body 12. The inverted cone at point 13 creates a turbulent flow that significantly reduces the amount of erosion on the upstream portion of the choke 10. Fluid is forced to flow around the diameter 14 in path B in annular area 22, resulting in a reduction in pressure. The cross sectional area 22 will be dependent on the pressure drop required, type of fluid and the amount of solids in the fluid. The cross sectional flow area 22 will be larger than the largest choke setting available in upstream or downstream piping. Fluid path C in area 23 has either the same or greater cross sectional flow area than path B in annular area 22. This will result in a reduction in fluid pressure and velocity from path B to path C. Fluid in path C is directed into holes 16, resulting in multiple fluid paths D. The diameter of holes 16 is preferably identical to ensure a symmetric flow pattern. Holes 16 have exits in the interior of body 12 that are opposed to the other exits or symmetrical about body 12, such that all fluids will collide at area 17 at the center of body 12. Fluid collision in area 17 further reduces fluid erosion in the choke body 12. The cross sectional area of area 17 will be larger than the cumulative cross sectional area of the plural holes 16. Fluids in path E flow through outlet 18, which as shown is tapered toward a larger flow area at the end profile 20 relative to the flow area within collision area 17. As fluids exit body 12 along path E through an increased taper with starting area 17 and exiting at outlet 18, a further decrease in pressure and velocity is achieved. The choke body 12 is able to accept erosional fluid flow at its inlet and then through the flow paths B, C, D and E, successfully reduce fluid pressure and velocity, thereby reducing erosion in downstream piping.

Figure 2:
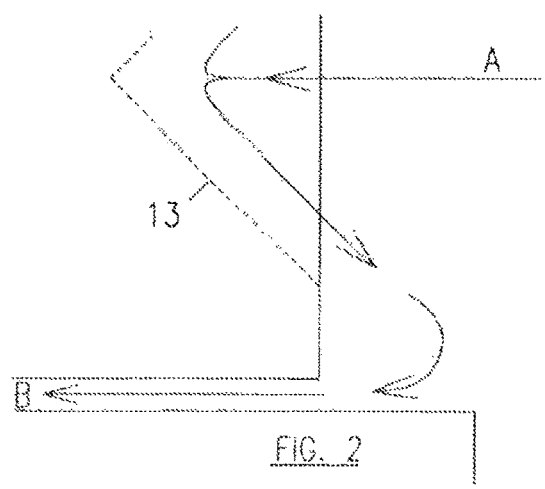
FIG. 2 is a detailed side elevation view in section of a choke for a flow line.

FIG. 2 illustrates a close up view of the fluid flow path B after initial fluid flow in path A has impacted on the front face of the choke body 12 and inverted cone 13. Fluid flow path B preferably has enough clearance between the exterior diameter 14 of choke body 12 and the internal diameter of tubular element 11 to not cause bridging of solids in the annular space. The calculated cross sectional area of this gap or annular area 22 is preferably larger than the largest choke or flow control system upstream or downstream of the flow control device.

FIG. 3 illustrates the cross-sectional view of the choke body 12. Concave impact cone 13 with corresponding end diameter 14 is upstream of the following section with diameter 15 and plural holes 16. In the depicted example, fluid impact area 17 is the common exit of all plural holes 16 leading to tapered outlet hole 18. Choke body 12 has exterior threads 19 designed to match with interior threading 21 of tubular element 11 seen in FIG. 1. Choke body 12 preferably has an end profile 20 that will accept a wrench to tighten or loosen the choke body 12 in tubular element 11. In this embodiment of the invention the end profile 20 is shown as a hexagonal wrench connection.

Figure 4:
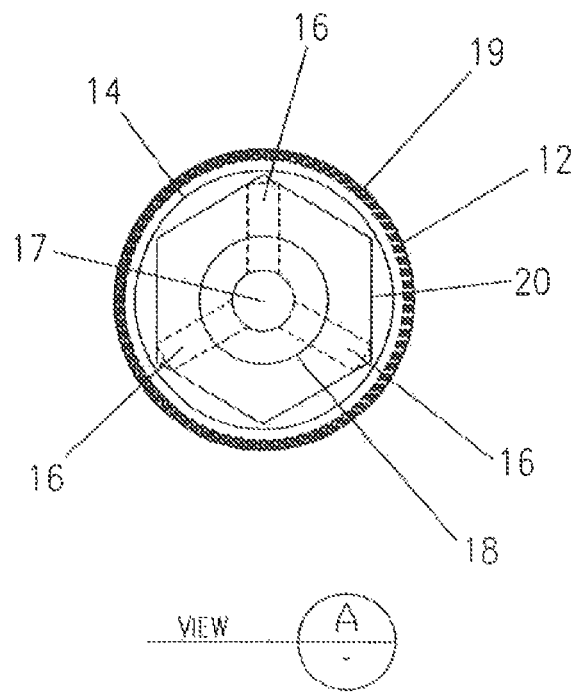
FIG. 4 is an end view of a choke for a flow line.

FIG. 4 illustrates an end view, downstream of the choke body 12. Visible from this profile is the fluid collision area 17 for the plural openings 16, the tapered exit hole from fluid collision area 17 to outlet hole location 18, the embodiment of a hexagonal wrench profile 20 and the exterior thread 19 that will match with interior thread in FIG. 1 item 21.

FIG. 5 illustrates an end view, upstream of the choke body 12. Visible from this profile is the front face of the flow control device including the impact cone 13 and the outer diameter 14, and the exterior thread 19 which matches with the interior thread 21 as indicated in FIG. 1.

Figure 6:
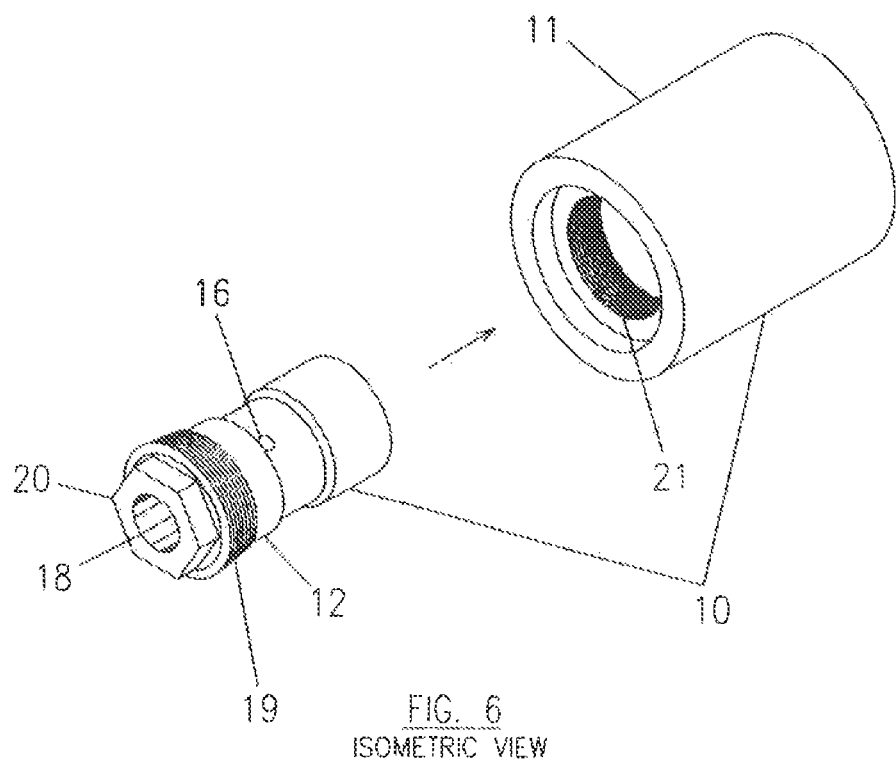
FIG. 6 is a perspective view of a choke for a flow line.

FIG. 6 illustrates the choke 10 with the choke body 12 and the tubular element 11 as they would be connected to each other. In the depicted example, choke body 12 will be threaded into the tubular element 11 by matching external threads 19 from device 12 with the internal threads 21 in tubular element 11.

It is to be understood that the relative dimensions shown in the examples, such as the dimensions of bodies 14 and 15 of the choke body 12, end cones 13, holes 16, outlet holes 18 threaded components 19 and 21, etc. are used as examples only, and may be modified according to the preferences of the user and to accommodate different types of fluids sent through the device, different upstream pressures, different tubular sizes, etc. The desired effect is to produce the desired downstream pressure and flow rate, as is well known to those skilled in the art.

Further modifications and alternative embodiments of the apparatus and method described herein will be apparent to those skilled in the art in view of this description. Accordingly this description is to be construed as illustrative only and is for the purpose of teaching those skilled in the art the manner of carrying out the described apparatus and method. It is to be understood that the examples herewith shown and described are to be taken as the presently preferred embodiment. Various changes may be made in shape, size and arrangement of parts. For example, equivalent elements or materials may be substituted for those illustrated and described herein, parts may be reversed, and certain features of the invention may be used independently of the use of the other features, all as would be apparent to one skilled in the art after having the benefit of this description In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A choke element for reducing the velocity and pressure of a fluid flow in a flow line, the flow line having an inner diameter, the choke element comprising:
   a body having an upstream end, a downstream end, and a sidewall that extends between the upstream end and the downstream end, the sidewall having a diameter that is sized to fit within the inner diameter of the flow line;
   a fluid impact face at the upstream end of the body, the fluid impact face having a recessed central portion; and
   a flow path in fluid communication between the downstream end and the upstream end of the body, the flow path comprising:
      a flow restriction formed by an annular space defined by the sidewall of the body and the inner diameter of the flow line;
      one or more radial passages that extend inward from the sidewall of the body at a point downstream of the flow restriction between the sidewall and the inner diameter of the flow line; and
      an axial passage that intersects the one or more radial passages and is in fluid communication with the downstream end of the body;
   wherein the flow restriction defines a point of greatest restriction of the flow path such that fluid traverses the point of greatest restriction as it flows in an axial direction, and wherein the flow restriction is in direct communication with the inner diameter of the flow line immediately upstream of the fluid impact face.

2. The choke element of claim 1, wherein the recessed central portion is a conical surface that tapers continuously from the fluid impact face to a recessed apex.

3. The choke element of claim 1, wherein the radial passages have a common point of intersection within the body.

4. The choke element of claim 1, wherein the flow area of the axial passage at the downstream end of the body is greater than the flow area of the axial passage at the radial passages, the axial passage being defined by a conical surface that comprises a continuous taper between the one or more radial passages and the downstream end of the body.

5. The choke element of claim 1, wherein the body comprises a threaded surface toward the downstream end that is sized to engage an inner threaded surface of the flow line.

6. The choke element of claim 1, wherein the flow path has a flow area that increases progressively from the flow restriction to the downstream end of the body.

7. In combination:
a flow line having a sidewall having inner diameter; and
a choke element installed within the flow line, the choke element comprising:
  a body having an upstream end, a downstream end, and a sidewall that extends between the upstream end and the downstream end;
  a flow path in fluid communication between the downstream end and the upstream end of the body; and
  a fluid impact face at the upstream end of the body, the fluid impact face having a recessed central portion, and the flow path being in direct communication with the inner diameter of the flow line immediately upstream of the fluid impact face;
  the flow path comprising:
    a flow restriction formed by an annular space defined by the sidewall of the body and the inner diameter of the flow line;
    one or more radial passages that extend inward from the sidewall of the body at a point downstream of the flow restriction between the sidewall of the body and the inner diameter of the flow line; and
    an axial passage that intersects the one or more radial passages and is in fluid communication with the downstream end of the body;
  wherein the flow restriction defines a point of greatest restriction of the flow path such that fluid traverses the point of greatest restriction as it flows in an axial direction, and wherein the flow restriction is in direct communication with the inner diameter of the flow line immediately upstream of the fluid impact face.

8. The combination of claim 7, wherein the recessed central portion is a concave surface that tapers continuously from the fluid impact face to a recessed apex.

9. The combination of claim 8, wherein the concave surface is conical.

10. The combination of claim 7, wherein the radial passages have a common point of intersection within the body.

11. The combination of claim 7, wherein the flow area of the axial passage at the downstream end of the body is greater than the flow area of the axial passage at the radial passages, the axial passage being defined by a conical surface that comprises a continuous taper between the one or more radial passages and the downstream end of the body.

12. The combination of claim 7, wherein the body of the choke element comprises an external threaded surface toward the downstream end and the flow line comprises an inner threaded surface of the flow line that engages the external threaded surface of the body.

13. The combination of claim 12, wherein the internal and external threaded surfaces engages to form a seal.

14. The combination of claim 7, wherein the flow path has a flow area that increases progressively from the flow restriction to the downstream end of the body.

\* \* \* \* \*